US012237925B2

(12) United States Patent
Yoshioka et al.

(10) Patent No.: US 12,237,925 B2
(45) Date of Patent: Feb. 25, 2025

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 339 days.

(21) Appl. No.: 17/762,607

(22) PCT Filed: Sep. 27, 2019

(86) PCT No.: PCT/JP2019/038414
§ 371 (c)(1),
(2) Date: Mar. 22, 2022

(87) PCT Pub. No.: WO2021/059540
PCT Pub. Date: Apr. 1, 2021

(65) Prior Publication Data
US 2022/0345249 A1 Oct. 27, 2022

(51) Int. Cl.
*H04L 1/1809* (2023.01)
*H04L 1/1812* (2023.01)
*H04L 5/00* (2006.01)
*H04W 92/18* (2009.01)

(52) U.S. Cl.
CPC .......... *H04L 1/1809* (2013.01); *H04L 1/1812* (2013.01); *H04L 5/0053* (2013.01); *H04W 92/18* (2013.01)

(58) Field of Classification Search
CPC ... H04L 1/1809; H04L 1/1812; H04L 5/0053; H04L 5/0055; H04W 92/16; H04W 92/18
See application file for complete search history.

(56) References Cited

U.S. PATENT DOCUMENTS

2017/0215183 A1* 7/2017 Gulati .................. H04L 1/1896
2020/0029318 A1* 1/2020 Guo ...................... H04L 1/1822
2020/0106566 A1* 4/2020 Yeo ...................... H04L 1/1854
2020/0220694 A1* 7/2020 Khoryaev ............. H04W 28/04
2020/0260231 A1* 8/2020 Ganesan .............. H04B 7/0695
2020/0267597 A1* 8/2020 Huang .................. H04L 1/1812
2020/0275463 A1* 8/2020 Gulati .................. H04L 1/1819
2020/0280398 A1* 9/2020 Hwang ................. H04L 5/0078
2020/0304969 A1* 9/2020 Basu Mallick ....... H04L 5/0055
2020/0336253 A1* 10/2020 He ........................ H04W 76/11
(Continued)

FOREIGN PATENT DOCUMENTS

WO WO-2020069088 A2 * 4/2020 .......... H04L 1/1664

OTHER PUBLICATIONS

Office Action issued in counterpart Japanese Patent Application No. 2021-548309 mailed on Dec. 5, 2023 (6 pages).
(Continued)

*Primary Examiner* — Kevin D Mew
(74) *Attorney, Agent, or Firm* — Osha Bergman Watanabe & Burton LLP

(57) ABSTRACT

A terminal includes a receiver that receives a plurality of radio signals transmitted via a sidelink; a controller that selects an operation pattern for Hybrid Automatic Repeat Request (HARQ) feedback for the plurality of radio signals based on a specific condition; and a transmitter that transmits sidelink HARQ feedback information in accordance with the selected operation pattern for the HARQ feedback.

5 Claims, 8 Drawing Sheets

FREQUENCY
TERMINAL 20B→ TERMINAL 20A
Slot
Sub−channel
PSCCH
PSFCH
PSCCH
PSFCH
PSSCH
PSCCH
PSSCH
PSFCH
PSSCH
If Nmax >= 3: simultaneous transmissions
Else: multiplex/drop
TERMINAL 20A→ TERMINAL 20B
TIME

(56) References Cited

U.S. PATENT DOCUMENTS

2021/0028910 A1* 1/2021 Cheng .................. H04L 5/0064
2021/0050950 A1* 2/2021 Zhou .................... H04W 76/14
2021/0091837 A1* 3/2021 Taherzadeh Boroujeni ................ H04L 5/0051
2021/0105673 A1* 4/2021 Jassal ................. H04W 36/185

OTHER PUBLICATIONS

Office Action issued in counterpart Japanese Patent Application No. 2021-548309 mailed on Aug. 8, 2023 (5 pages).
Office Action issued in the counterpart Chinese Patent Application No. 201980100627.5, mailed on May 22, 2023 (15 pages).
Extended European Search Report issued in counterpart European Patent Application No. 19946571.7, mailed on Jun. 9, 2023 (8 pages).
International Search Report issued in PCT/JP2019/038414 on Apr. 28, 2020 (3 pages).
Written Opinion of the International Searching Authority issued in PCT/JP2019/038414 on Apr. 28, 2020 (3 pages).
LG Electronics; "Summary of RAN1 Agreements/Working assumptions in WI 5G V2X with NR sidelink"; 3GPP TSG RAN WG1 #98, R1-1909921; Prague, CZ; Aug. 26-30, 2019 (15 pages).
Spreadtrum Communications; "Discussion on NR V2X physical layer procedure"; 3GPP TSG RAN WG1 #96, R1-1902724; Athens, Greece; Feb. 25-Mar. 1, 2019 (7 pages).
3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).
3GPP TS 36.211 V15.6.0; "3rd Generation Partnership Project; Technical Specification Group Radio Access Network; Evolved Universal Terrestrial Radio Access (E-UTRA); Physical channels and modulation (Release 15)"; Jun. 2019 (239 pages).

* cited by examiner

Sub-channel
Slot
TIME
FREQUENCY
TERMINAL 20B→
TERMINAL 20A
PSFCH
PSFCH
PSCCH
Groupcast
PSSCH
PSCCH
Groupcast
PSSCH
TERMINAL
20A→
Group#1
TERMINAL
20A→
Group#1

TERMINAL AND COMMUNICATION METHOD

TECHNICAL FIELD

The present invention relates to a terminal and a communication method in a radio communication system.

BACKGROUND ART

For Long Term Evolution (LTE) and LTE successor systems (e.g., LTE-Advanced (LTE-A) and New Radio (NR) (which is also referred to as 5G)), sidelink (which is also referred to as Device to Device (D2D)) technology has been studied in which terminals, such as User Equipment (UE), communicate directly with each other without going through a base station.

In addition, implementation of Vehicle to Everything (V2X) has been studied and technical specifications have been developed. Here, V2X is a part of Intelligent Transport Systems (ITS) and, as illustrated in FIG. 1, V2X is a generic term for Vehicle to Vehicle (V2V), which implies a communication mode executed between vehicles; Vehicle to Infrastructure (V2I), which implies a communication mode executed between a vehicle and a road-side unit (RSU: Road-Side Unit); Vehicle to Nomadic device (V2N), which implies a communication mode executed between a vehicle and a driver's mobile terminal; and a Vehicle to Pedestrian (V2P), which implies a communication mode executed between a vehicle and a pedestrian's mobile terminal.

RELATED ART DOCUMENT

Non-Patent Document

Non-Patent Document 1: 3GPP TS 36.211 V15.6.0 (2019 June)

Non-Patent Document 2: 3GPP TR 22.886 V15.1.0 (2017 March)

SUMMARY OF THE INVENTION

Problem to be Solved by the Invention

Currently, in a 3GPP meeting, overlapping of Physical Sidelink Feedback Channels (PSFCHs) has been discussed. Several cases of overlapping have been assumed as overlapping of PSFCHs.

There is a need for clarifying an operation of a terminal in a case where multiple PSFCH transmissions overlap, so that transmissions and receptions can be appropriately performed.

Means for Solving the Problem

According to an aspect of the present invention, there is provided a terminal including a receiver that receives a plurality of radio signals transmitted via a sidelink; a controller that selects an operation pattern for Hybrid Automatic Repeat Request (HARQ) feedback for the plurality of radio signals based on a specific condition; and a transmitter that transmits sidelink HARQ feedback information in accordance with the selected operation pattern for the HARQ feedback.

Advantage of the Invention

According to an embodiment, an operation of a terminal can be clarified in a case where multiple PSFCH transmissions overlap, so that transmissions and receptions can be appropriately performed.

EMBODIMENTS OF THE INVENTION

In the following, embodiments of the present invention (the embodiments) are described with reference to the drawings. The embodiments described below are merely examples, and the embodiments to which the present invention is applied are not limited to the following embodiments.

A method of inter-terminal direct communication according to the embodiments is assumed to be LTE or NR sidelink (SL (sidelink)), but the method of inter-terminal direct communication is not limited to this method. Additionally, the name "sidelink" is an example and Uplink (UL) may include a function of SL without using the name "sidelink." SL may be distinguished from Downlink (DL) or UL by a difference in frequency or time resource and SL may have another name.

UL and SL may also be distinguished by a difference in one or more combinations of time resources, frequency resources, time and frequency resources, reference signals referenced to determine a Pathloss in transmission power control, and reference signals used for synchronization (PSS/SSS/PSSS/SSSS).

For example, for UL, a reference signal of an antenna port X_ANT is used as a reference signal to be referenced to determine a Pathloss in transmission power control, and for SL (including UL used as SL), a reference signal of antenna port Y_ANT is used as a reference signal to be referenced to determine a Pathloss in transmission power control.

In the embodiments, it is mainly assumed that a terminal (which may be referred to as user equipment (UE)) is installed in a vehicle, but embodiments of the present invention are not limited to this configuration. For example, a terminal may be a terminal carried by a person, a terminal may be a device installed in a drone or an aircraft, or a terminal may be a base station, an RSU, a relay station (relay node), a user equipment having a scheduling capability, or the like.

(System Configuration)

Figure 1:
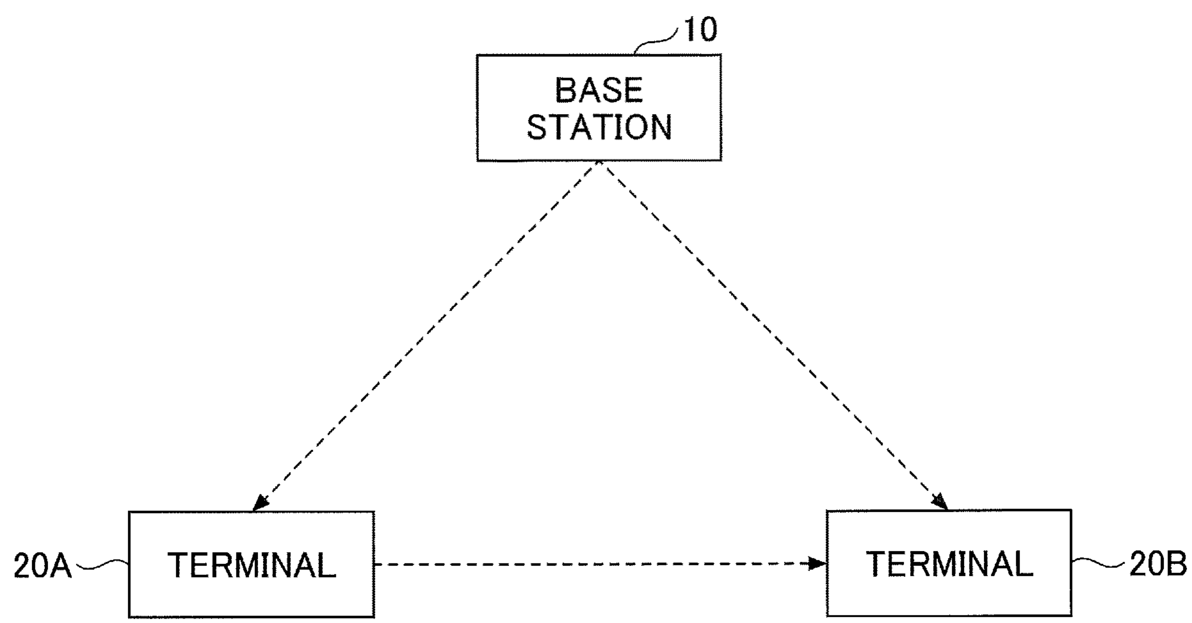
FIG. 1 is a diagram illustrating an example of a configuration of a radio communication system according to an embodiment.

FIG. 1 is a diagram illustrating an example of a configuration of a radio communication system according to an embodiment. As illustrated in FIG. 1, a radio communication system according to the embodiment includes a base station 10, a terminal 20A, and a terminal 20B. Note that, in practice, there may be a large number of terminals, but FIG. 1 illustrates the terminal 20A and the terminal 20B as an example.

In FIG. 1, the terminal 20A is intended to be the transmitting side and the terminal 20B is intended to be the receiving side. However, each of the terminal 20A and the terminal 20B is provided with both transmission function and reception function. In the following, when the terminals 20A, 20B, and the like are not particularly distinguished, it is simply described as the terminal 20 or the terminal. In FIG. 1, for example, a case is indicated in which both the terminal 20A and the terminal 20B are within the coverage. However, the operation according to this embodiment can be applied to a case in which all the terminals 20 are within the coverage; a case in which some of the terminals 20 are within the coverage and other terminals 20 are outside the coverage; and a case in which all the terminals 20 are outside the coverage.

In the embodiments, the terminal 20 is, for example, a device installed in a vehicle such as an automobile and has a function of cellular communication as a UE in the LTE or NR and a side link function. Additionally, the terminal 20 includes functions, such as a GPS device, a camera, various types of sensors, for obtaining report information (location, event information, or the like). The terminal 20 may be a typical mobile terminal (such as a smartphone). The terminal 20 may be an RSU. The RSU may be a UE-type RSU with UE functions, a BS-type RSU with base station functions (also referred to as gNB-type UE), or a relay station.

The terminal 20 need not be a single housing device. For example, even if various types of sensors are distributed in a vehicle, the device including the various types of sensors is the terminal 20. The terminal 20 need not include various types of sensors, and the terminal 20 may include a function for transmitting data to and receiving data from the various types of sensors.

The details of processing of sidelink transmission by the terminal 20 are basically the same as the details of processing of UL transmission in the LTE or NR. For example, the terminal 20 scrambles a code word of transmission data, modulates to generate complex-valued symbols, and maps the complex-valued symbols to one or two layers for precoding. The precoded complex-valued symbols are then mapped to a resource element to generate a transmission signal (e.g., CP-OFDM, DFT-s-OFDM) and the transmission signal is transmitted from each antenna port.

The base station 10 has a function of cellular communication as the base station 10 in LTE or NR, and the base station 10 has a function for enabling communication of the terminal 20 according to the embodiments (e.g., resource pool configuration or resource allocation). The base station 10 may be an RSU (gNB-type RSU), a relay station, or a terminal having a scheduling function.

In the radio communication system according to the embodiments, a signal waveform used by the terminal 20 for SL or UL may be OFDMA, SC-FDMA, or other signal waveforms. In the radio communication system according to the embodiments, as an example, a frame including a plurality of subframes (e.g., 10 subframes) is formed in the time direction, and the frequency direction is formed of a plurality of subcarriers. One subframe is an example of one transmission Time Interval (TTI). However, TTIs are not necessarily subframes. For example, a TTI may be in units of slots or mini-slots or other time domain units. In addition, the number of slots per subframe may be determined in accordance with the subcarrier spacing. The number of symbols per slot may be 14.

In a sidelink communication of 3GPP Release 16 NR, Hybrid Automatic Repeat Request (HARQ) is expected to be introduced. In a sidelink communication, a HARQ-Acknowledgement (HARQ-ACK) is transmitted by using a Physical Sidelink Feedback Channel (PSFCH).

A transport block is transmitted from a transmitting terminal 20A to a receiving terminal 20B on a Physical Sidelink Control Channel (PSCCH)/a Physical Sidelink Shared Channel (PSSCH). In response, the terminal 20B transmits a HARQ-ACK to the terminal 20A on the PSFCH.

(Overview of NR V2X)

In SL transmission mode 1 specified in NR V2X, the base station 10 schedules a transmission resource and assigns the transmission resource to the transmitting terminal 20A. The terminal 20A transmits a signal to the receiving terminal 20B with the assigned transmission resource.

In SL transmission mode 2*a*, for example, the transmitting terminal 20A autonomously selects a transmission resource and transmits a signal to the receiving terminal 20B with the selected transmission resource.

In the SL transmission mode 2*c*, for example, the base station 10 preconfigures transmitting resources with a constant period/pattern to the terminal 20A (e.g., by a higher layer parameter), and the terminal 20A transmits the signal to the receiving terminal 20B by using the transmitting resources with the constant period/pattern. Here, instead of the base station 10 preconfiguring the transmitting resources with the constant period/pattern to the terminal 20A, for example, the transmitting resources with the constant period/pattern may be configured to the terminal 20A according to a technical specification.

In SL transmission mode 2*d*, for example, the terminal 20 performs an operation that is the same as an operation of the base station 10. Specifically, the terminal 20 schedules transmission resources and assigns the transmission resources to the transmitting terminal 20A. The terminal 20A may transmit to the receiving terminal 20B with the assigned communication resources. That is, the terminal 20 may control the transmission of other terminals 20 (e.g., the terminal 20A and/or the terminal 20B).

Furthermore, in NR V2X, three cast types, namely, unicast, groupcast, and broadcast have been studied.

Unicast refers, for example, to a one-to-one transmission from the transmitting terminal 20A to the receiving terminal 20B.

Groupcast refers, for example, to a transmission from the transmitting terminal 20A to the terminal 20B and a receiving terminal 20B', which are a group of the receiving terminal 20.

Broadcast refers, for example, to a transmission from the transmitting terminal 20A to the terminal 20B, the terminal 20B', and a terminal 20B", which are all the receiving terminals 20 within a predetermined range.

Currently, in the 3GPP meeting, the overlapping of the Physical Sidelink Feedback Channel (PSFCH) has been discussed. The following overlap cases are assumed as the overlap of PSFCHs.

(Case 1)

A case where transmission and reception overlap in PSFCH.

(Case 2)

A case where PSFCH transmissions to the plurality of terminals 20 overlap. In this case, for example, it has been studied to select N PSFCH transmissions based on priority. The priority of PSFCH may be based on at least on the priority indicated by the Physical Sidelink Control Channel (PSCCH)/Physical Sidelink Shared Channel (PSSCH) associated with the PSFCH. Other priorities (e.g., a cast type, a HARQ state, HARQ feedback option, number of PSCCH/PSSCH transmissions, collision state) may depend on the implementation of terminal 20.

(Case 3)

A case of PSFCH transmission with multiple HARQ feedbacks to the same terminal 20. Discussions are taking place on whether to multiplex multiple HARQ-ACK bits on a single PSFCH and on whether to apply a method of selecting N PSFCHs based on the priority of Case 2 described above.

The conditions under which multiple Sidelink HARQ-ACK bits are multiplexed are currently unknown.

For example, whether a HARQ-ACK bit for a unicast transmission and HARQ-ACK bits for a groupcast transmission should be multiplexed on a single PSFCH is currently unknown. In Option 1 of the HARQ feedback for a groupcast, the receiving terminal 20 provides feedback to the transmitting terminal 20 only in the case of NACK. However, in Option 2 of the HARQ feedback for a groupcast, the receiving terminal 20 provides feedback to the transmitting terminal 20 in the case of ACK and NACK. Thus, it is currently unknown whether the same type of multiplexing mechanism applies to Options 1 and 2 of HARQ-ACK feedback for groupcasts with different feedback mechanisms.

Furthermore, it can be considered to select (i) simultaneous transmissions of multiple HARQ feedbacks via the multiple PSFCHs, or (ii) to multiplex some of the multiple HARQ feedbacks on a single PSFCH resource and transmit the multiplexed HARQ feedbacks, taking into account the maximum number of simultaneous transmissions.

In the case where the PSFCH transmissions to the plurality of terminals 20 is overlapped, and transmitting the plurality of HARQ-ACK bits to the plurality of terminals 20, the processing for transmitting the plurality of HARQ-ACK bits to a certain terminal 20 needs to be clarified.

(Proposal)

The receiving terminal 20B may select, based on a specific condition, a sidelink HARQ feedback operational pattern. For example, the receiving terminal 20B may select to transmit multiple sidelink HARQ-ACK bits by multiplexing the multiple sidelink HARQ-ACK bits, or not to transmit some of the multiple sidelink HARQ-ACK bits.

(Proposal A)

The receiving terminal 20B may select, based on a cast type of the sidelink communication (e.g., whether the HARQ-ACK is a groupcast HARQ-ACK or a unicast HARQ-ACK), to multiplex and transmit multiple sidelink HARQ-ACK bits by multiplexing the multiple sidelink HARQ-ACK bits, or not to transmit some of the multiple sidelink HARQ-ACK bits. In the present invention, the groupcast HARQ-ACK may mean the HARQ-ACK corresponding to the groupcast transmission, and the unicast HARQ-ACK may mean the HARQ-ACK corresponding to the unicast transmission.

(A-1)

For example, when a HARQ-ACK corresponding to a unicast transmission of a sidelink from terminal 20A and a HARQ-ACK corresponding to another unicast transmission of a sidelink from terminal 20A are transmitted at the same timing, terminal 20B may transmit these multiple HARQ-ACK bits by multiplexing these multiple HARQ-ACK bits on the same PSFCH. That is, since each of these plurality of HARQ-ACK bits is transmitted to the terminal 20A, the multiple HARQ-ACKs can be multiplexed and transmitted. In each embodiment, “the same timing” may mean that the time resources for transmitting one HARQ-ACK bit and the time resources for transmitting the other HARQ-ACK bit are completely identical, at least in part overlapping, or within the same time unit (e.g., slot). That is, it is not limited to a case in which the time resources for transmitting one HARQ-ACK bit and the time resources for transmitting the other HARQ-ACK bit are exactly the same.

(A-2)

For example, when the timing of transmitting the HARQ-ACK corresponding to the sidelink groupcast transmission from the terminal 20A and the timing of transmitting the HARQ-ACK corresponding to another sidelink groupcast transmission from the terminal 20A are the same, the terminal 20B may transmit the plurality of HARQ-ACK bits by multiplexing the plurality of HARQ-ACK bits on the same PSFCH (A-2-1). Alternatively, the terminal 20B need not transmit some of these HARQ-ACK bits (A-2-2).

Figure 2:
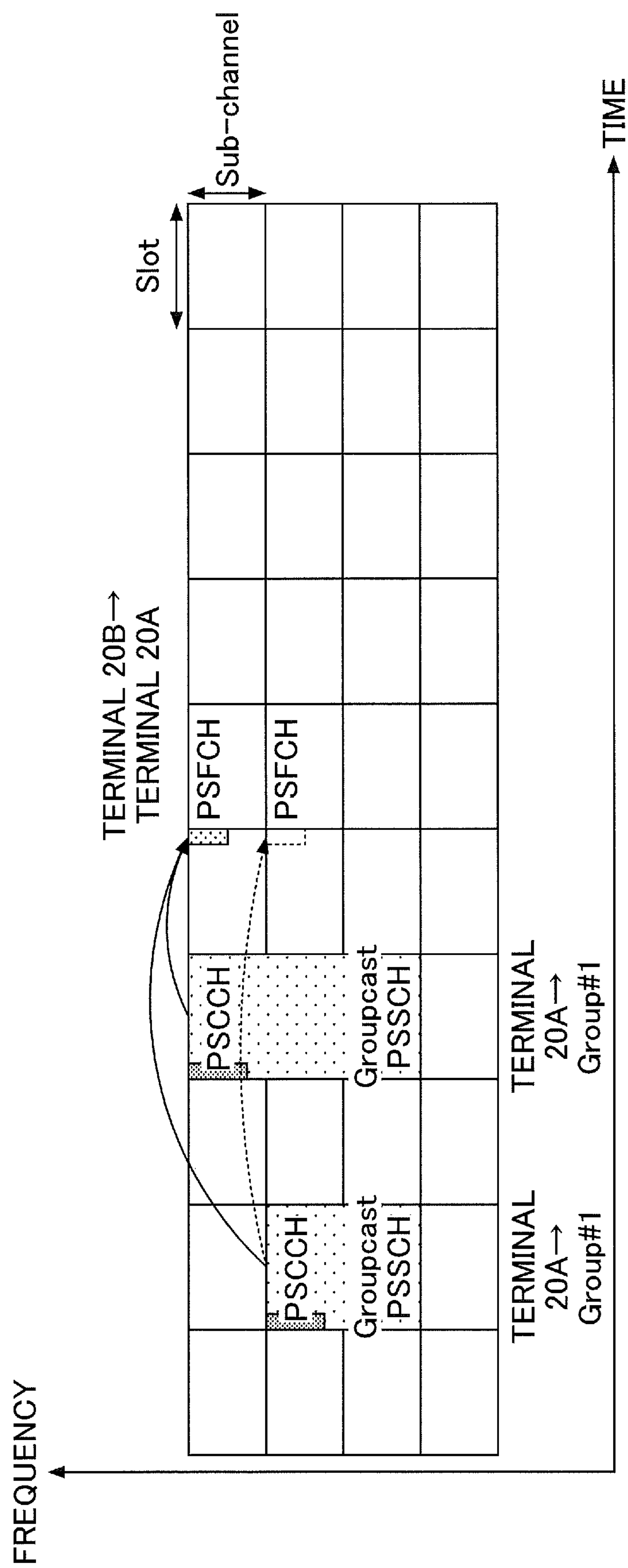
FIG. 2 is a diagram illustrating an example in which a plurality of HARQ-ACK bits is transmitted while being multiplexed on a same PSFCH.

FIG. 2 is a diagram illustrating an example of A-2-1. As illustrated in FIG. 2, the terminal 20A performs the groupcast transmission with respect to group #1 via PSCCH/PSSCH at a certain timing and performs the groupcast transmission with respect to group #1 via PSCCH/PSSCH at another timing. It is assumed that group #1 includes terminal 20B. The terminal 20B will transmit two HARQ-ACK bits to terminal 20A. In this case, it is assumed that the timings of two PSFCH resources for the terminal 20B to transmit the two HARQ-ACK bits are the same. In this case, the terminal 20B may multiplex the two HARQ-ACK bits in one of the two PSFCH resources and transmit the multiplexed two HARQ-ACK bits in that one PSFCH. Here, “multiplexing” may mean configuring multiple bits so that the multiple bits can be transmitted on a single channel. For example, multiplexing a plurality of bits may be channel coding the plurality of bits so that so that the plurality of bits can be transmitted in a single channel.

(A-3)

For example, assume that the timing of transmitting the HARQ-ACK corresponding to the unicast sidelink transmission from the terminal 20A and the timing of transmitting the HARQ-ACK corresponding to the sidelink groupcast transmission from the terminal 20A are the same.

(A-3-1)

(Option x)

In this case, for example, the terminal 20B may multiplex these plurality of HARQ-ACK bits on a PSFCH resource for transmitting HARQ-ACK corresponding to the sidelink unicast transmission.

(Option y)

Alternatively, for example, the terminal 20B may multiplex these plurality of HARQ-ACK bits on a PSFCH resource for transmitting HARQ-ACK corresponding to the sidelink groupcast transmission.

(Option z)

Alternatively, for example, the terminal 20B may multiplex these plurality of HARQ-ACK bits in a dedicated PSFCH resource.

(A-3-2)

As in (A-3) above, for example, assume that the timing of transmitting HARQ-ACK corresponding to a unicast sidelink transmission from the terminal 20A and the timing of transmitting HARQ-ACK corresponding to a sidelink groupcast transmission from the terminal 20A are the same timing.

(Option i)

In this case, for example, the terminal 20B may transmit the HARQ-ACK bits for the sidelink groupcast transmission by using a PSFCH resource to transmit the HARQ-ACK corresponding to the sidelink groupcast transmission without transmitting the HARQ-ACK bit for the sidelink unicast transmission from among these plurality of HARQ-ACK bits.

(Option ii)

Alternatively, for example, the terminal 20B may transmit the HARQ-ACK bit for the sidelink unicast transmission by using a PSFCH resource to transmit the HARQ-ACK corresponding to the unicast sidelink transmission, without transmitting the HARQ-ACK bits for the sidelink groupcast transmission, among these plurality of HARQ-ACK bits.

Figure 3:
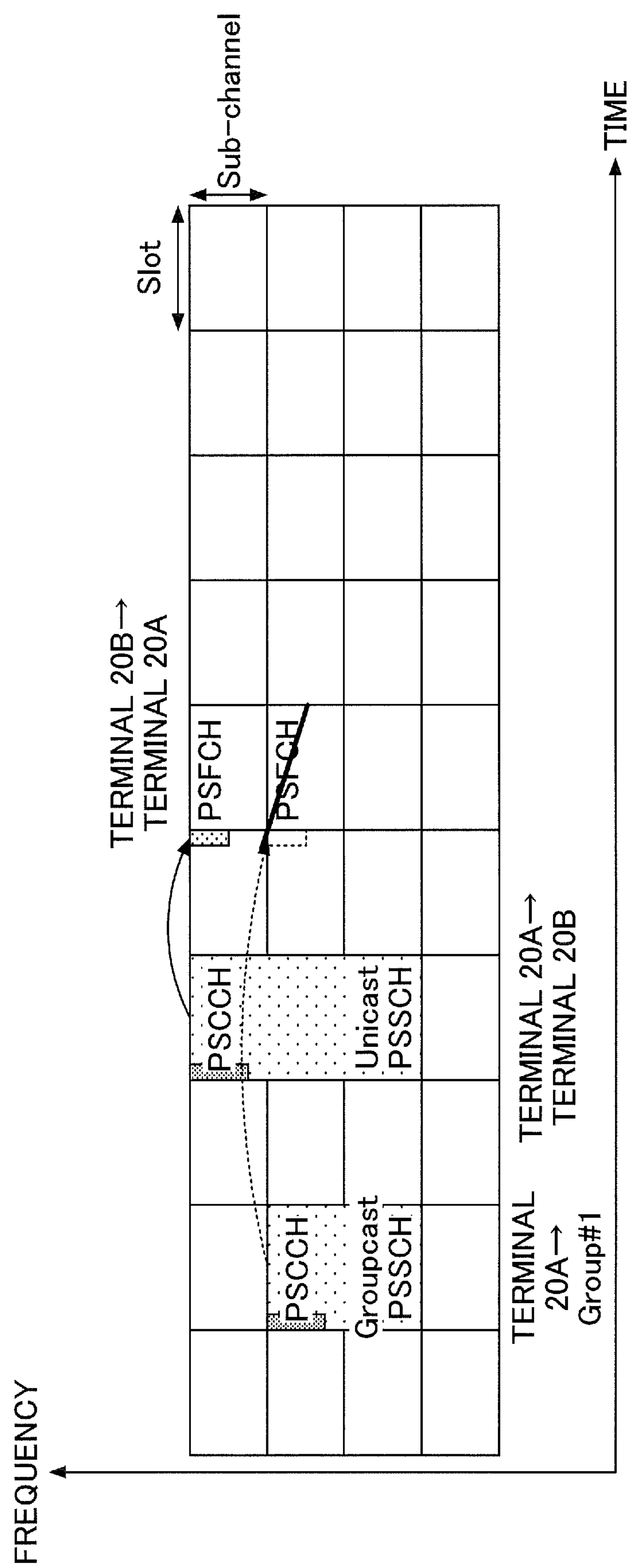
FIG. 3 is a diagram illustrating an example of a case in which HARQ feedback is performed for a unicast transmission and HARQ feedback is not performed for a groupcast transmission.

FIG. 3 is a diagram illustrating an example of Option ii of A-3-2. As illustrated in FIG. 3, the terminal 20A performs a groupcast transmission to the group #1 through the PSCCH/PSSCH at a certain timing and performs a unicast transmission to the terminal 20B through the PSCCH/PSSCH at another timing. It is assumed that group #1 includes terminal 20B. In this case, assume that the timing at which the terminal 20B is to transmit HARQ-ACK bits for the groupcast transmission is the same as the timing at which the terminal 20B is to transmit a HARQ-ACK bit for the unicast transmission. The terminal 20B may transmit the HARQ-ACK bit for the unicast transmission by using a PSFCH resource to transmit the HARQ-ACK for the unicast transmission, and the terminal 20B need not transmit the HARQ-ACK bits for the groupcast transmission.

(Option iii)

Alternatively, for example, the terminal 20B may transmit a HARQ-ACK bit for a high priority transmission by using a PSFCH resource to transmit the HARQ-ACK corresponding to the high priority transmission, without transmitting a HARQ-ACK bit for a low priority transmission of the groupcast and the unicast, among these plurality of HARQ-ACK bits.

According to the configuration of Proposal A, by multiplexing multiple sidelink HARQ-ACK bits on a PSFCH resource for transmitting the HARQ-ACK, the multiple sidelink HARQ-ACK bits can be simultaneously transmitted. Accordingly, it is possible to enhance the reliability of the sidelink communication and efficiency of resource utilization. In addition, when transmitting a HARQ-ACK bit for a high-priority sidelink cast type transmission without transmitting a HARQ-ACK bit for a low-priority sidelink cast type transmission, from among multiple sidelink HARQ-ACK bits, the HARQ feedback for the high-priority sidelink cast type transmission can be performed more reliably.

(Proposal A')

The receiving terminal 20B may select the sidelink HARQ feedback operation pattern based on one of the HARQ feedback options (Option 1: transmitting only NACK, Option 2: transmitting ACK and NACK) for a groupcast transmission in the sidelink communication.

(A'-1)

For example, a HARQ feedback operation pattern for a groupcast and a HARQ feedback operation pattern for a unicast in a case where the HARQ feedback for the groupcast in the sidelink communication is Option 1 may differ from those of a case where the HARQ feedback for the groupcast in the sidelink communication is Option 2.

For example, when the timing of transmitting the HARQ-ACK corresponding to unicast sidelink transmission from the terminal 20A and the timing of transmitting the HARQ-ACK corresponding to sidelink groupcast transmission from the terminal 20A are the same, and the Option of the HARQ feedback of the groupcast is Option 2, the terminal 20B may transmit multiple HARQ-ACK bits by multiplexing the multiple HARQ-ACK bits in a single PSFCH resource.

For example, when the timing of transmitting a HARQ-ACK corresponding to a sidelink unicast transmission from the terminal 20A is the same as the timing of transmitting a HARQ-ACK corresponding to a sidelink groupcast transmission from the terminal 20A, and the HARQ feedback option of the groupcast is Option 1, the terminal 20B may transmit, without transmitting a HARQ-ACK bit for one cast type of a groupcast and a unicast, from among the plurality of HARQ-ACK bits, the HARQ-ACK bit for the other cast type transmission, for example, by using a PSFCH resource to transmit the HARQ-ACK corresponding to the other cast type transmission.

(A'-2)

For example, according to the HARQ feedback options of the groupcasts in the sidelink communication, the HARQ feedback operation patterns for multiple groupcasts may be different.

For example, when the timing of transmitting a HARQ-ACK corresponding to a sidelink groupcast transmission from the terminal 20A is the same as the timing of transmitting a HARQ-ACK corresponding to another groupcast transmission from the terminal 20A, and the HARQ feedback options for the two groupcast transmissions are the same (Option 1 or Option 2), the terminal 20B may transmit multiple HARQ-ACK bits by multiplexing the multiple HARQ-ACK bits on one PSFCH resource.

For example, when the timing of transmitting HARQ-ACK corresponding to a sidelink groupcast transmission from terminal 20A and the timing of transmitting HARQ-ACK corresponding to another groupcast transmission from terminal 20A are the same, and the HARQ feedback option for one of the groupcast transmissions is different from the HARQ feedback option for the other groupcast transmission, the terminal 20B may transmit HARQ-ACK bits for the other groupcast transmission, for example, by using a PSFCH resource to transmit HARQ-ACK bits for the other groupcast transmission without transmitting HARQ-ACK bits for the one of these two groupcast transmissions, from among these plurality of HARQ-ACK bits.

According to the configuration of Proposal A', multiple sidelink HARQ-ACK bits can be simultaneously transmitted by multiplexing the multiple sidelink HARQ-ACK bits in a PSFCH resource for transmitting the HARQ-ACK. Accordingly, the reliability of the sidelink communication and the efficiency of resource utilization can be enhanced. In addition, when transmitting a HARQ-ACK bit for a high-priority sidelink transmission without transmitting a HARQ-ACK bit for a low-priority sidelink transmission, from among multiple sidelink HARQ-ACK bits, HARQ feedback for the high-priority sidelink transmission can be performed more reliably.

(Proposal B)

Based on the maximum number of PSFCH transmissions that can be performed at the same timing, the receiving terminal 20B may select an operation pattern for sidelink HARQ feedback. For example, the receiving terminal 20B may select to transmit multiple HARQ-ACK bits by multiplexing the multiple HARQ-ACK bits, or not to transmit some HARQ-ACK bits from among the multiple sidelink HARQ-ACK bits.

(B-1)

For example, when the terminal 20B is assumed to transmit multiple sidelink HARQ-ACK bits to the terminal 20A at the same timing, and the number of assumed PSFCH transmissions is greater than the maximum number of PSFCH transmissions that can be performed at the same timing, the terminal 20B may select, as the operation pattern for the sidelink HARQ feedback, for example, to transmit the multiple sidelink HARQ-ACK bits by multiplexing the multiple sidelink HARQ-ACK bits, or not to transmit some HARQ-ACK bits from among the multiple sidelink HARQ-ACK bits.

Figure 4:
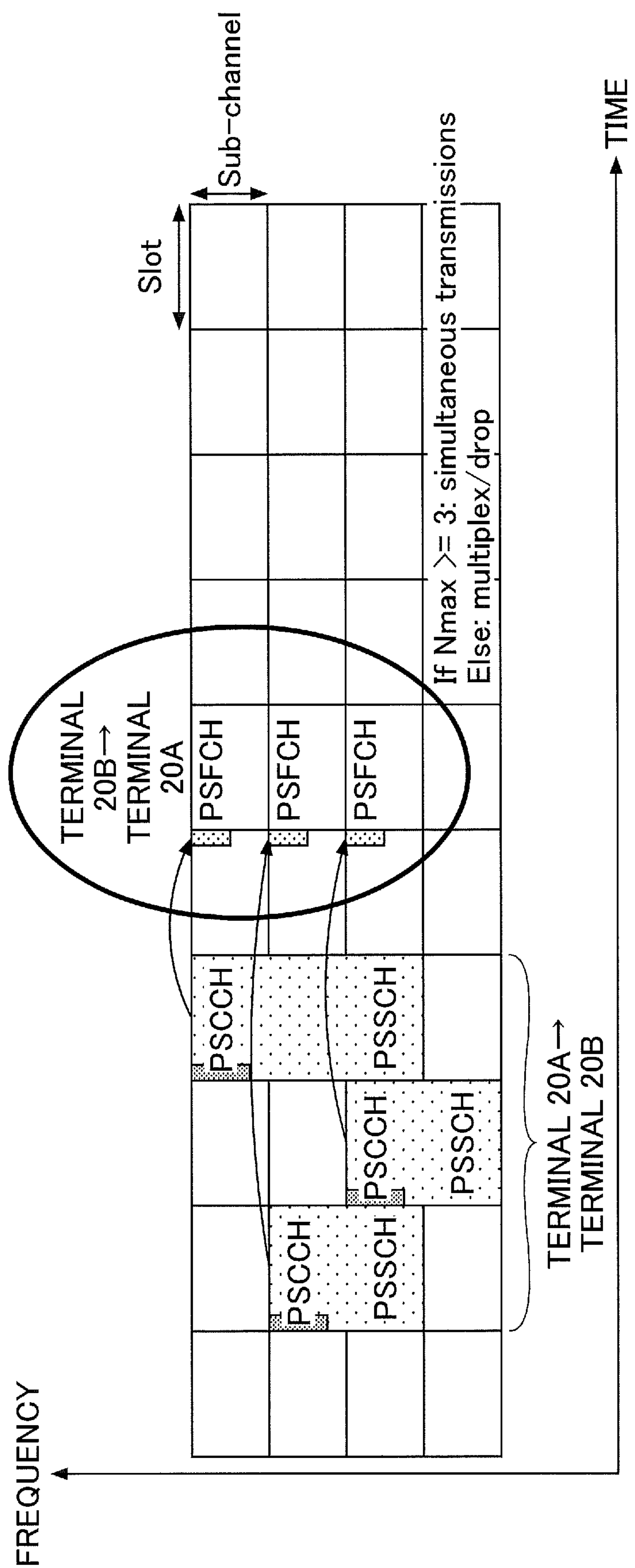
FIG. 4 is a diagram illustrating an example in which an operation pattern for sidelink HARQ feedback is selected based on a maximum number of PSFCH transmissions.

FIG. 4 is a diagram illustrating an example in which the terminal 20B selects an operation pattern of the sidelink HARQ feedback based on the maximum number of PSFCH transmissions. In the example of FIG. 4, the number of PSFCH transmissions from the terminal 20B to the terminal 20A that are assumed to be performed at the same timing is three. Here, for example, when the maximum number (Nmax) of PSFCH transmissions that can be performed at the same timing is three or more, the terminal 20B may perform the three PSFCH transmissions at the same timing without performing a multiplexing/dropping or the like. For example, when the Nmax is less than 3, the terminal 20 may select, for example, to transmit multiple sidelink HARQ-ACK bits by multiplexing the multiple sidelink HARQ-ACK bits, or not to transmit some HARQ-ACK bits of the three sidelink HARQ-ACK bits.

(B-2)

For example, in the case where the terminal 20B transmits multiple sidelink HARQ-ACK bits to the terminal 20A at the same timing, the terminal 20B may select an operation pattern for sidelink HARQ feedback regardless of the maximum number of PSFCH transmissions that can be performed at the same timing. For example, the terminal 20 may select to transmit the multiple sidelink HARQ-ACK bits by multiplexing the multiple sidelink HARQ-ACK bits or not to transmit some HARQ-ACK bits from among the multiple sidelink HARQ-ACK bits. When, as a result of selecting the sidelink HARQ feedback operation pattern, the terminal 20B is assumed to transmit multiple sidelink PSFCHs at the same timing, the terminal 20B may further select either to transmit the multiple sidelink HARQ-ACK bits by multiplexing the multiple sidelink HARQ-ACK bits, or not to transmit some of the multiple sidelink HARQ-ACK bits based on the maximum number of PSFCH transmissions that are performed at the same timing.

According to the configuration of Proposal B, when multiple PSFCH transmissions are performed simultaneously to a terminal, it is possible to clarify the procedure so that transmission and reception are performed appropriately.

(Proposal C)

The receiving terminal 20B may select a sidelink HARQ feedback operation pattern based on at least one of the transmitting terminal 20A, the priority of the PSFCH transmission, or the number of PSFCH transmissions. For example, the receiving terminal 20B may select to transmit multiple sidelink HARQ-ACK bits by multiplexing the multiple sidelink HARQ-ACK bits, or not to transmit some HARQ-ACK bits from among the multiple sidelink HARQ-ACK bits.

(C-1)

For example, assume that the terminal 20B transmits a plurality of HARQ-ACK bits to the plurality of transmitting terminals 20A at the same timing.

As a first step, for example, the terminal 20B may select to transmit multiple sidelink HARQ-ACK bits by multiplexing the multiple sidelink HARQ-ACK bits, or not to transmit some of the multiple sidelink HARQ-ACK bits, for each terminal 20A of the plurality of transmitting terminals 20A.

As a second step, for example, for the assumed multiple PSFCH transmissions as the result of the first step, based on the priority between the multiple PSFCH transmissions and/or the number of the multiple PSFCH transmissions, the terminal 20B may select to transmit the multiple sidelink HARQ-ACK bits by multiplexing the multiple sidelink HARQ-ACK bits, or not to transmit some HARQ-ACK bits of the multiple sidelink HARQ-ACK bits. When multiple HARQ-ACK bits are multiplexed and transmitted on one PSFCH, the priority of the HARQ-ACK bit having the highest priority, from among the multiplexed multiple HARQ-ACK bits, may be applied as the priority of the PSFCH transmission, or the priority for the multiplexed HARQ-ACK bits may be applied. The priority for the multiplexed HARQ-ACK bits may be (pre)configured.

Figure 5:
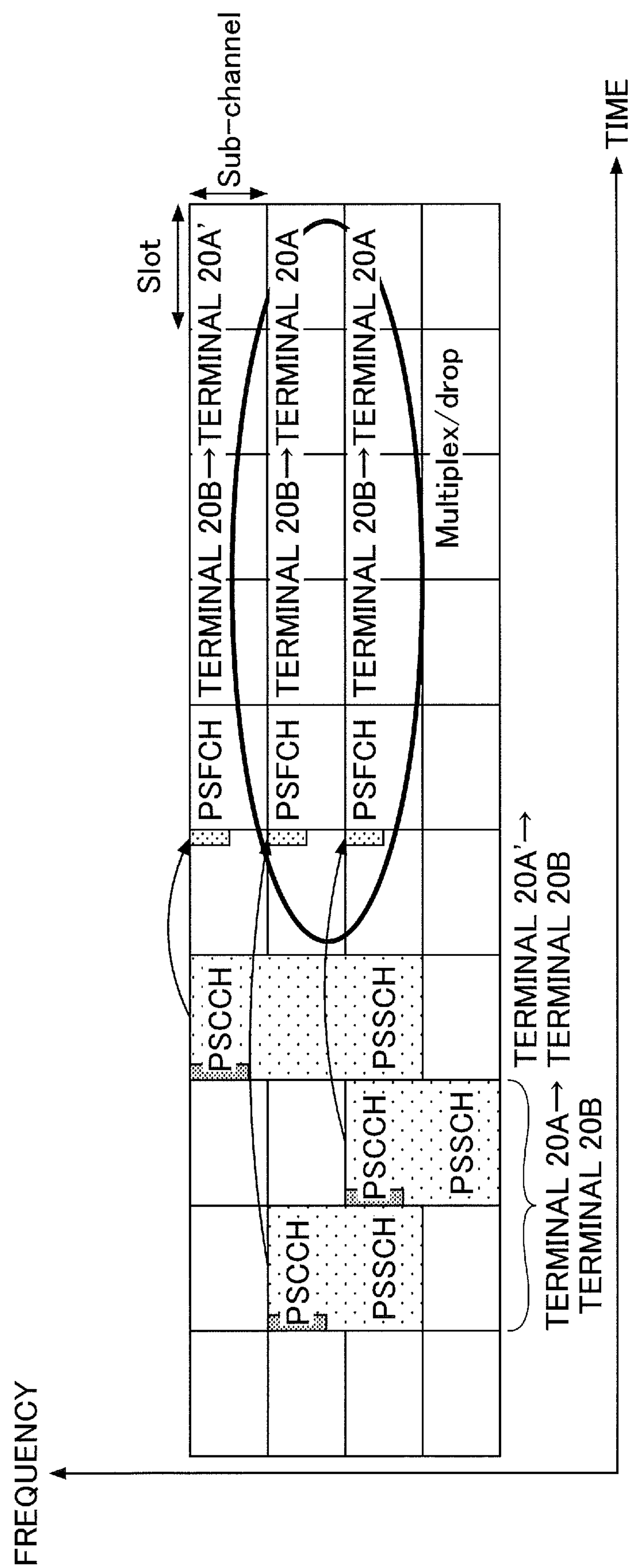
FIG. 5 is a diagram illustrating an example in which an operation pattern for sidelink HARQ feedback is selected based on at least one of the number of transmitting terminals, priority, or the number of PSFCH transmissions.
Figure 6:
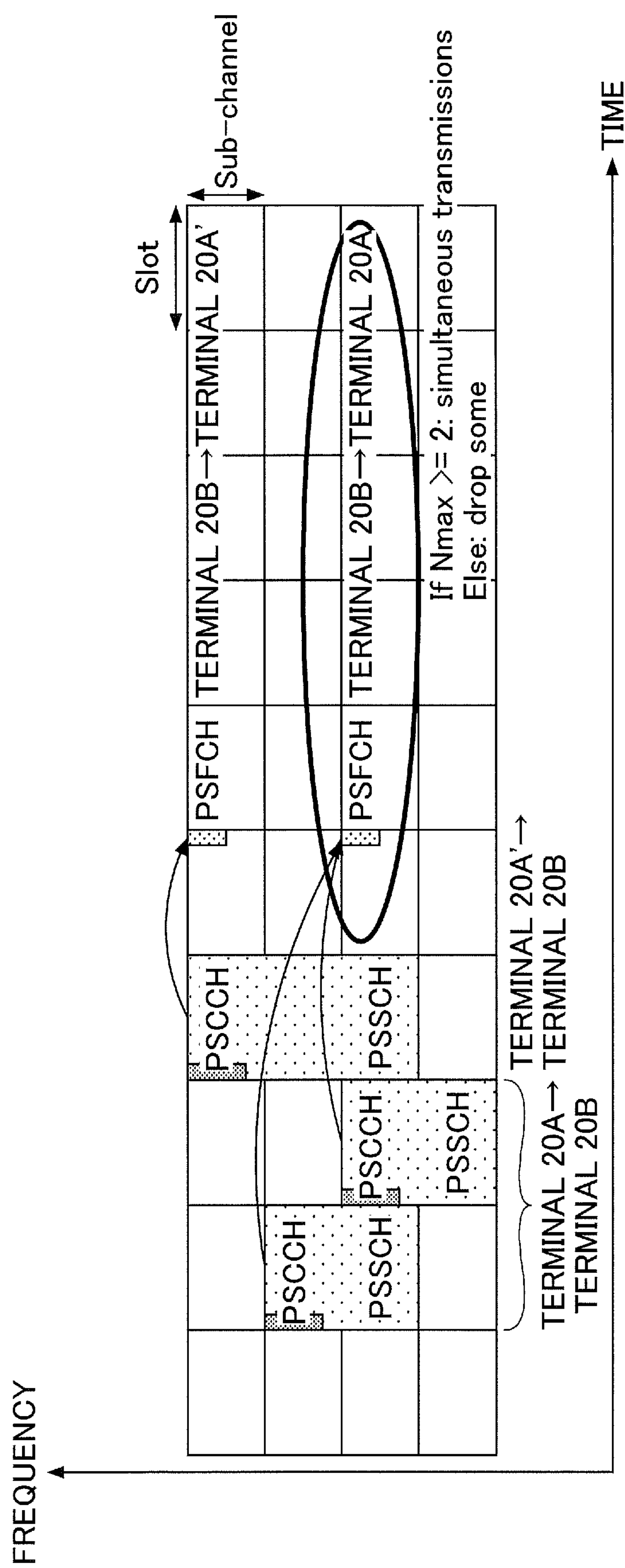
FIG. 6 is a diagram illustrating an example in which an operation pattern for sidelink HARQ feedback is selected based on at least one of the number of transmitting terminals, priority, or the number of PSFCH transmissions.

FIG. 5 and FIG. 6 are diagrams illustrating examples of selecting a sidelink HARQ feedback operation pattern based on at least one of the number of transmitting terminals, the priority order, or the number of PSFCH transmissions.

As illustrated in the example of FIG. 5, the receiving terminal 20B receives two transport blocks transmitted on PSCCH/PSSCH from the transmitting terminal 20A and one transport block transmitted on PSCCH/PSSCH from the transmitting terminal 20A'. In this case, as illustrated in FIG. 5, it is assumed that two PSFCH transmissions to the transmitting terminal 20A and one PSFCH transmission to the transmitting terminal 20A' are performed at the same timing by the terminal 20B. As a first step, in FIG. 5, two PSFCH transmissions from the terminal 20B to the terminal 20A are assumed to be performed simultaneously, so the terminal 20B multiplexes two HARQ-ACK bits that are assumed to be transmitted by these two PSFCH transmissions on one PSFCH resource.

FIG. 6 is a diagram illustrating an example where two HARQ-ACK bits are multiplexed on one PSFCH after the first step. In the example of FIG. 6, it is assumed that the PSFCH transmission from the terminal 20B to the terminal 20A and the PSFCH transmission from the terminal 20B to the terminal 20A' are performed simultaneously. In this case, for example, the terminal 20B may select a sidelink HARQ feedback operation pattern, based on the maximum number (Nmax) of PSFCH transmissions that can be performed at the same timing. For example, the terminal 20B may select to transmit the multiple sidelink HARQ-ACK bits by multiplexing the multiple sidelink HARQ-ACK bits, or not to transmit some HARQ-ACK bits of the multiple sidelink HARQ-ACK bits. For example, when Nmax is greater than or equal to 2, the terminal 20B may simultaneously perform the PSFCH transmission from the terminal 20B to the terminal 20A and the PSFCH transmission from the terminal 20B to the terminal 20A'. For example, when Nmax is 1, the terminal 20B may perform the PSFCH transmission having a high priority among the PSFCH transmission from the terminal 20B to the terminal 20A and the PSFCH transmission from the terminal 20B to the terminal 20A', without performing the PSFCH transmission having a low priority. In the PSFCH transmission from the terminal 20B to the terminal 20A, two HARQ-ACK bits to be transmitted to the terminal 20A are multiplexed. Accordingly, the terminal 20B may apply the priority of the HARQ-ACK bit with the higher priority of the two HARQ-ACK bits, as the priority of the PSFCH transmission from the terminal 20B to the terminal 20A.

(C-2)

For example, suppose that the terminal 20B transmits a plurality of HARQ-ACK bits to the plurality of transmitting terminals 20A at the same timing.

As a first step, for example, the terminal 20B reduces the number of PSFCH transmissions that are assumed to be performed simultaneously, so that the number of the PSFCH transmissions that are assumed to be performed simultaneously becomes less than or equal to the maximum number (Nmax) of the PSFCH transmissions that can be performed at the same timing, based on the priority based on the priority of the PSFCH transmissions that are assumed to be performed simultaneously, without considering the plurality of terminals 20A that are the destinations of the HARQ-ACK bits.

As a second step, for example, when, among the plurality of PSFCH transmissions remaining as a result of the first step, there is a plurality of PSFCH transmissions having the same destination that is the terminal 20A, the terminal 20B may select to transmit the multiple sidelink HARQ-ACK bits to be transmitted to the terminal 20A by multiplexing the multiple sidelink HARQ-ACK bits, or not to transmit some of HARQ-ACK bits, from among the multiple sidelink HARQ-ACK bits assumed to be transmitted to the terminal 20A.

According to the configuration of Proposal C, in a case where PSFCH transmissions to multiple terminals are to be performed at the same timing, it is possible to clarify the procedure so that transmission and reception are performed appropriately.

(Device Configuration)

Next, a functional configuration example of the base station 10 and the terminal 20 that perform the processing operations described above is described.

<Base Station 10>

Figure 7:
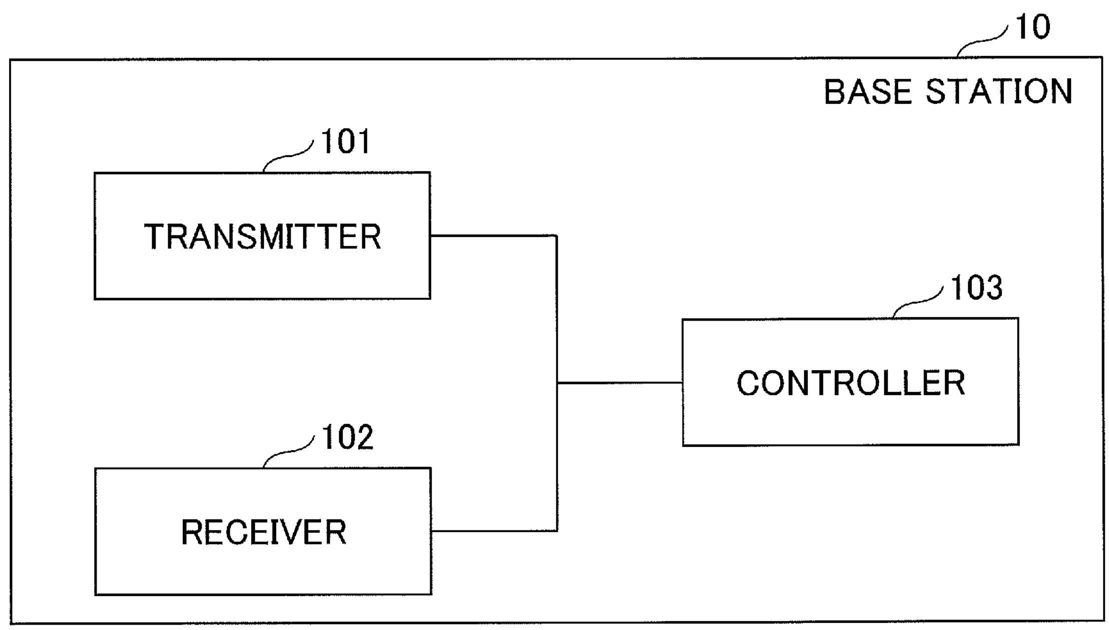
FIG. 7 is a diagram illustrating an example of a functional configuration of a base station according to an embodiment.

FIG. 7 is a diagram illustrating an example of a functional configuration of the base station 10. As illustrated in FIG. 7, the base station 10 includes a transmitter 101, a receiver 102, and a controller 103. The functional configuration illustrated in FIG. 7 is merely one example. The functional division and names of functional units may be any division and names, provided that the operation according to the embodiments of the present invention can be performed. Note that the transmitter 101 may be referred to as a transmitting device, and the receiver 102 may be referred to as a receiving device.

The transmitter 101 includes a function for generating a signal to be transmitted to the terminal 20 and wirelessly transmitting the signal. The receiver 102 includes a function for receiving various types of signals wirelessly transmitted from the terminal 20 and obtaining a higher layer signal from the received signal. Furthermore, the receiver 102 includes a function for measuring a received signal to obtain a quality value.

The controller 103 controls the base station 10. Note that a function of the controller 103 related to transmission may be included in the transmitter 101 and a function of the controller 103 related to reception may be included in the receiver 102.

<Terminal 20>

Figure 8:
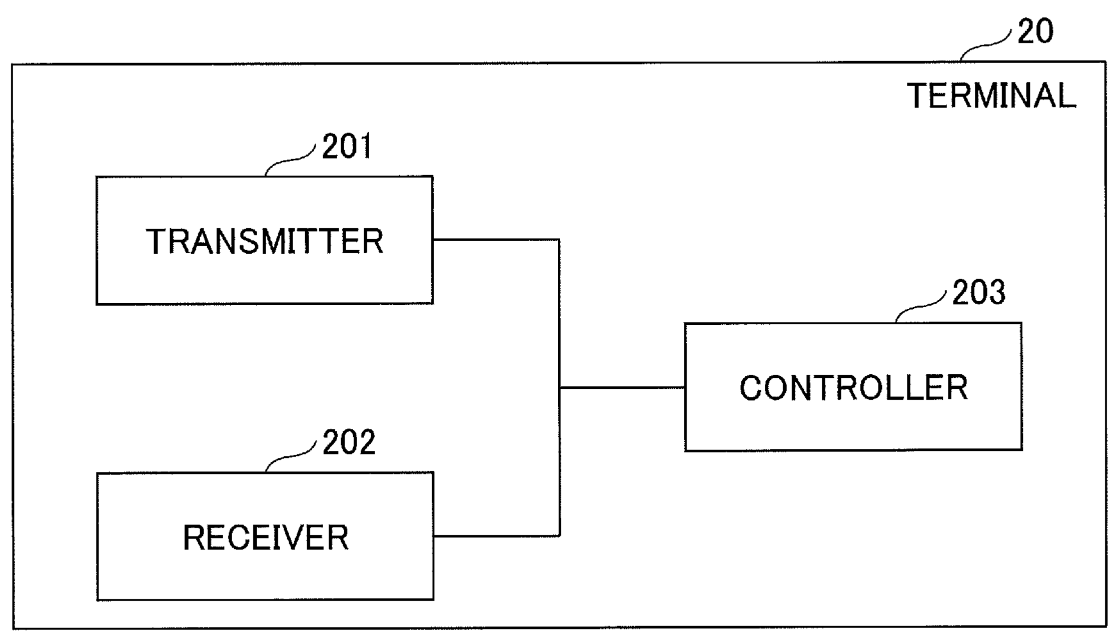
FIG. 8 is a diagram illustrating an example of a functional configuration of a terminal according to an embodiment.

FIG. 8 is a diagram illustrating an example of a functional configuration of the terminal 20. As illustrated in FIG. 8, the terminal 20 includes a transmitter 201, a receiver 202, and a controller 203. The functional configuration illustrated in FIG. 8 is merely an example. The functional division and names of functional units may be any division and names, provided that the operation according to the embodiments can be performed. Note that the transmitter 201 may be referred to as a transmitting device, and the receiver 202 may be referred to as a receiving device. Furthermore, the terminal 20 may be the transmitting terminal 20A or the receiving terminal 20B.

The transmitter 201 generates a transmitting signal from transmitting data and transmits the transmitting signal through radio. The receiver 202 receives various types of signals and obtains a higher layer signal from the received physical layer signal. The receiver 202 includes a function for measuring a received signal and obtaining a quality value.

The controller 203 controls of the terminal 20. Note that the function of the controller 203 related to transmission may be included in the transmitter 201, and the function of the controller 203 related to reception may be included in the receiver 202.

For example, the controller 203 of the terminal 20 may select a sidelink HARQ feedback operation pattern based on a specific condition. For example, the controller 203 of the terminal 20 may select to transmit multiple sidelink HARQ-ACK bits by multiplexing the multiple sidelink HARQ-ACK bits, or not to transmit HARQ-ACK bits of the multiple sidelink HARQ-ACK bits.

For example, the controller 203 of the terminal 20 may select to transmit multiple sidelink HARQ-ACK bits by multiplexing the multiple sidelink HARQ-ACK bits, or not to transmit some HARQ-ACK bits of the multiple sidelink HARQ-ACK bits, based on the casting type of the sidelink communication.

For example, the controller 203 of the terminal 20 may select a sidelink HARQ feedback operation pattern based on one of the HARQ feedback options (Option 1: transmitting only NACK, Option 2: transmitting ACK and NACK) for groupcast transmission in the sidelink communication.

For example, the controller 203 of the terminal 20 may select a sidelink HARQ feedback operation pattern based on the maximum number of PSFCH transmissions that can be performed at the same timing. For example, the controller 203 of the terminal 20 may select to transmit multiple sidelink HARQ-ACK bits by multiplexing the multiple sidelink HARQ-ACK bits, or not to transmit HARQ-ACK bits of the multiple sidelink HARQ-ACK bits.

For example, the controller 203 of the receiving terminal 20B may select a sidelink HARQ feedback operation pattern, based on at least one of the number of terminals 20A, the priority, and the number of PSFCH transmissions. For example, the controller 203 of the receiving terminal 20B may select to transmit multiple sidelink HARQ-ACK bits by multiplexing the multiple sidelink HARQ-ACK bits, or not to transmit some HARQ-ACK bits of the multiple sidelink HARQ-ACK bits.

<Hardware Configuration>

The block diagrams (FIG. 7 to FIG. 8) used for the description of the above embodiments illustrate blocks of functional units. These functional blocks (components) are implemented by any combination of at least one of hardware or software. In addition, the implementation method of each functional block is not particularly limited. That is, each functional block may be implemented using a single device that is physically or logically combined, or may be implemented by directly or indirectly connecting two or more devices that are physically or logically separated (e.g., using wire or radio) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 9:
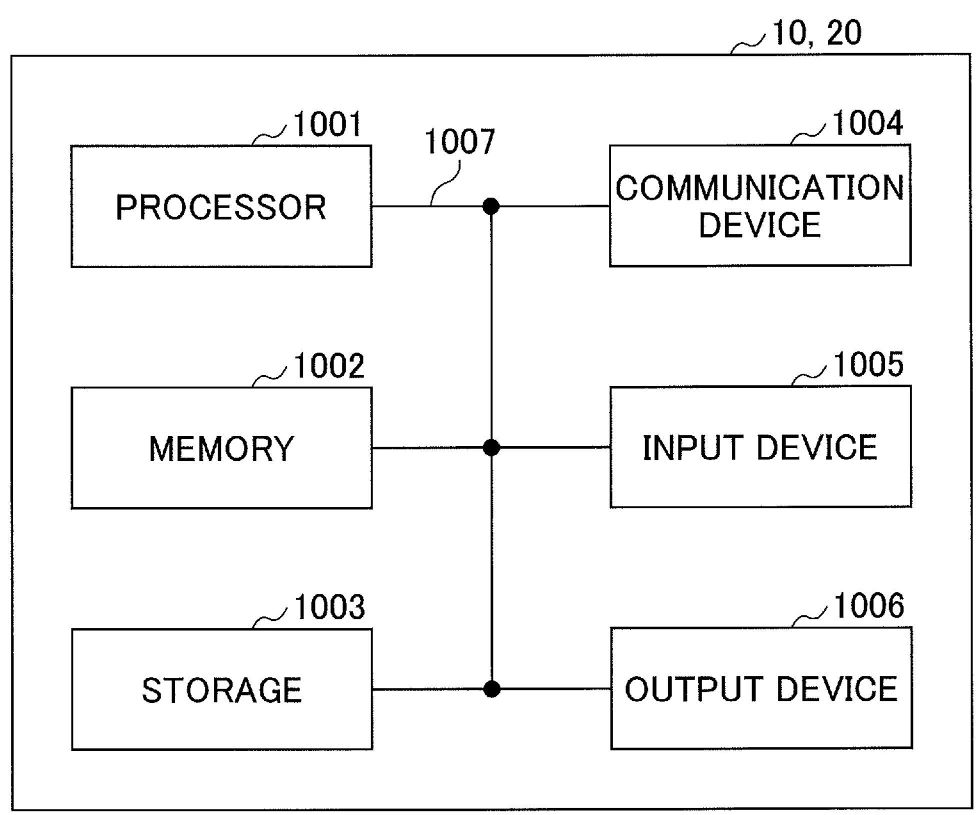
FIG. 9 is a diagram illustrating an example of a hardware configuration of the base station and the terminal according to an embodiment.

For example, the terminal 20 and the base station 10 according to the embodiments of the present invention may function as computers performing the process of the radio communication according to the embodiments of the present invention. FIG. 9 is a diagram illustrating an example of a hardware configuration of the terminal 20 and the base station 10 according to the embodiment. Each of the above-described terminal 20 and the base station 10 may be physically configured as a computer device including a processor 1001, a memory 1002, a storage 1003, a communication device 1004, an input device 1005, an output device 1006, a bus 1007, or the like.

Note that, in the following description, the term "device" can be replaced with a circuit, a device, a unit, or the like. The hardware configuration of the terminal 20 and the base station 10 may be configured to include one or more of the devices depicted in the figures, which are indicated by 1001 through 1006, or may be configured without some devices.

Each function of the terminal 20 and the base station 10 is implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, or the like.

Additionally, the processor 1001 reads a program (program code), a software module, data, or the like from at least one of the storage 1003 and the communication device 1004 to the memory 1002, and executes various processes according to these. As the program, a program is used which causes a computer to execute at least a part of the operations described in the above-described embodiment. For example, the controller 203 of the terminal 20 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), an Electrically Erasable Programmable ROM (EEPROM), and a Random Access Memory (RAM). The memory 1002 may be referred to as a register, a cache, a main memory (main storage device), or the like. The memory 1002 may store a program (program code), a software module, or the like, which can be executed for implementing the radio communication method according to the embodiments of the present disclosure.

The storage 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk), a smart card, a flash memory (e.g., a card, a stick, a key drive), a floppy (registered trademark) disk, or a magnetic strip. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, or the like. The communication device 1004 may be configured to include, for example, a high frequency switch, a duplexer, a filter, a frequency synthesizer, or the like to implement at least one of frequency division duplex (FDD: Frequency Division Duplex) and time division duplex (TDD: Time Division Duplex).

The input device 1005 is an input device (e.g., a keyboard, mouse, microphone, switch, button, or sensor) that receives an external input. The output device 1006 is an output device (e.g., a display, speaker, or LED lamp) that implements an external output. The input device 1005 and the output device 1006 may have an integrated configuration (for example, a touch panel).

Each device, such as the processor 1001 and the memory 1002, is also connected by the bus 1007 for communicating information. The bus 1007 may be formed of a single bus or may be formed of different buses between devices.

The terminal 20 and the base station 10 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of the functional blocks. For example, processor 1001 may be implemented using at least one of these hardware components.

Conclusion of the Embodiments

In this specification, at least the following terminal and communication method are disclosed.

A terminal including a receiver that receives a plurality of radio signals transmitted via a sidelink; a controller that selects an operation pattern for Hybrid Automatic Repeat Request (HARQ) feedback for the plurality of radio signals based on a specific condition; and a transmitter that transmits sidelink HARQ feedback information in accordance with the selected operation pattern for the HARQ feedback.

According to the above configuration, it is possible to clarify a terminal operation, upon multiple PSFCH transmissions being overlapped, so as to perform signal transmission and signal reception appropriately.

The controller may select the operation pattern for the HARQ feedback for the plurality of radio signals based on a cast type of each radio signal of the plurality of radio signals transmitted via the sidelink.

According to the above-described configuration, it is possible to define an HARQ feedback operation pattern for a plurality of radio signals, based on the cast type of each of the plurality of radio signals. Accordingly, it can be ensured that transmission and reception operation are performed appropriately.

The controller may select the operation pattern for the HARQ feedback for the plurality of radio signals based on a HARQ feedback option applied to a sidelink groupcast transmission.

According to the above configuration, it is possible to select an appropriate HARQ feedback operation pattern for a plurality of radio signals, according to whether the HARQ feedback option for the sidelink groupcast transmission is Option 1 (transmitting NACK only) or Option 2 (transmitting ACK and NACK).

The controller may select the operation pattern for the HARQ feedback for the plurality of radio signals based on a maximum number of Physical Sidelink Feedback Channel (PSFCH) transmissions performable at a same timing.

According to the above configuration, when the number of PSFCH transmissions, which are assumed to be performed at the same timing, is greater than the maximum number, the number of PSFCH transmissions to be performed at the same timing can be reduced to be less than or equal to the maximum number, for example, by selecting to transmit the multiple sidelink HARQ-ACK bits by multiplexing the multiple sidelink HARQ-ACK bits, or not to transmit some HARQ-ACK bits of the multiple sidelink HARQ-ACK bits.

The controller may select the operation pattern for the HARQ feedback for the plurality of radio signals based on at least one of a transmitting terminal, a priority order of each of a plurality of Physical Sidelink Feedback Channel (PSFCH) transmissions, or a number of the plurality of PSFCH transmissions.

According to the above configuration, it is possible to clarify the terminal operation when multiple PSFCH transmissions are overlapped so that transmission and reception are performed appropriately.

A communication method performed by a terminal, the method including receiving a plurality of radio signals transmitted via a sidelink; selecting an operation pattern for Hybrid Automatic Repeat Request (HARQ) feedback for the plurality of radio signals based on a specific condition; and transmitting sidelink HARQ feedback information in accordance with the selected operation pattern for the HARQ feedback.

According to the above configuration, it is possible to clarify the terminal operation, upon multiple PSFCH transmissions being overlapped, so as to perform signal transmission and signal reception appropriately.

Supplemental Embodiments

While the embodiments of the present invention are described above, the disclosed invention is not limited to the embodiments, and those skilled in the art will appreciate various alterations, modifications, alternatives, substitutions, or the like. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (as long as there is no contradiction) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiments, the order of processing may be changed as long as there is no contradiction. For the convenience of the description of the process, the terminal 20 and the base station 10 are described using functional block diagrams, but such devices may be implemented in hardware, software, or a combination thereof. Software operated by a processor included in the terminal 20 in accordance with the embodiments of the present invention and software operated by a processor included in the base station 10 in accordance with the embodiments of the present invention may be stored in a random access memory (RAM), a flash memory, a read-only memory (ROM), an EPROM, an EEPROM, a register, a hard disk (HDD), a removable disk, a CD-ROM, a database, a server, or any other suitable storage medium.

Notification of information is not limited to the aspects/embodiments described in the disclosure, and notification of information may be made by another method. For example, notification of information may be implemented by physical layer signaling (e.g., Downlink Control Information (DCI), Uplink Control Information (UCI), higher layer signaling (e.g., Radio Resource Control (RRC) signaling, Medium Access Control (MAC) signaling, broadcast information (Master Information Block (MIB), System Information Block (SIB))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses.

Additionally, a plurality of systems may be combined (e.g., a combination of at least one of LTE and LTE-A and 5G) to be applied.

The processing procedures, sequences, flow charts, and the like of each aspect/embodiment described in this disclosure may be reordered, provided that there is no contradiction. For example, the methods described in this disclosure present elements of various steps in an exemplary order and are not limited to the particular order presented.

The particular operation described in this disclosure to be performed by the base station 10 may be performed by an upper node in some cases. It is apparent that in a network consisting of one or more network nodes having the base station 10, various operations performed for communicating with the terminal may be performed by at least one of the base station 10 and a network node other than the base station 10 (e.g., MME or S-GW can be considered, however, the network node is not limited to these). The case is exemplified above in which there is one network node other than the base station 10. However, the network node other than the base station 10 may be a combination of multiple other network nodes (e.g., MME and S-GW).

Input and output information may be stored in a specific location (e.g., memory) or managed using management tables. Input and output information may be overwritten, updated, or added. Output information may be deleted. The input information may be transmitted to another device.

The determination may be made by a value (0 or 1) represented by 1 bit, by a true or false value (Boolean: true or false), or by comparison of numerical values (e.g., a comparison with a predefined value).

The aspects/embodiments described in this disclosure may be used alone, in combination, or switched with implementation. Notification of predetermined information (e.g. “X” notice) is not limited to a method that is explicitly performed, and may also be made implicitly (e.g. “no notice of the predetermined information”).

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, or the like.

Software, instructions, information, or the like may also be transmitted and received via a transmission medium. For example, when software is transmitted from a website, server, or other remote source using at least one of wireline technology (such as coaxial cable, fiber optic cable, twisted pair, digital subscriber line) and wireless technology (e.g., infrared or microwave), at least one of these wireline technology and wireless technology is included within the definition of a transmission medium.

The information, signals, or the like described in this disclosure may be represented using any of a variety of different techniques. For example, data, instructions, commands, information, signals, bits, symbols, chips, or the like which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message.

As used in this disclosure, the terms “system” and “network” are used interchangeably. The information, parameters, or the like described in the present disclosure may also be expressed using absolute values, relative values from predetermined values, or they may be expressed using corresponding separate information. For example, radio resources may be those indicated by an index.

The names used for the parameters described above are not restrictive in any respect. In addition, the mathematical equations using these parameters may differ from those explicitly disclosed in this disclosure. Since the various channels (e.g., PUCCH or PDCCH) and information elements can be identified by any suitable name, the various names assigned to these various channels and information elements are not in any way limiting.

In this disclosure, the terms “Base Station,” “Radio Base Station,” “Fixed Station,” “NodeB,” “eNodeB (eNB),” “gNodeB (gNB),” “Access Point,” “Transmission Point,” “Reception Point,” “Transmission/Reception Point,” “Cell,” “Sector,” “Cell Group,” “Carrier,” “Component Carrier,” and the like may be used interchangeably. The base stations may be referred to in terms such as macro-cell, small-cell, femto-cell, or pico-cell.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term “cell” or “sector” refers to a portion or all of the coverage area of at least one of the base station and base station subsystem that provides communication services at the coverage.

In this disclosure, terms such as “mobile station (MS: Mobile Station)”, “user terminal”, “user equipment (UE: User Equipment)”, “terminal”, or the like may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, or the like. The mobile body may be a vehicle (e.g., a car or an airplane), an unmanned mobile (e.g., a drone or an automated vehicle), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be replaced with the user terminal. For example, various aspects/embodiments of the present disclosure may be applied to a configuration in which communication between the base station and the user terminal is replaced with communication between multiple user terminals (e.g., may be referred to as Device-to-Device (D2D) or Vehicle-to-Everything (V2X)). In this case, a configuration may be such that the above-described function of the base station 10 is included in the user terminal 20. The terms “up” and “down”

may also be replaced with the terms corresponding to terminal-to-terminal communication (e.g., "side"). For example, an uplink channel, a downlink channel, or the like may be replaced with a sidelink channel.

Similarly, the user terminal according to the present disclosure may be replaced with a base station. In this case, a configuration may be such that, the function included in the above-described user terminal 20 may be included in the base station 10.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standard applied.

As used in this disclosure, the expression "based on" does not mean "based on only" unless otherwise specified. In other words, the expression "based on" means both "based on only" and "at least based on."

As long as "include," "including," and variations thereof are used in this disclosure, the terms are intended to be inclusive in a manner similar to the term "comprising." Furthermore, the term "or" used in the disclosure is intended not to be an exclusive OR.

A radio frame may be formed of one or more frames in the time domain. In the time domain, each of the one or more frames may be referred to as a subframe. A subframe may further be formed of one or more slots in the time domain. A subframe may be a fixed time length (e.g., 1 ms) that does not depend on numerology.

The numerology may be a communication parameter to be applied to at least one of transmission or reception of a signal or a channel. The numerology may represent, for example, at least one of a subcarrier spacing (SCS: SubCarrier Spacing), a bandwidth, a symbol length, a cyclic prefix length, a transmission time interval (TTI: Transmission Time Interval), a symbol number per TTI, a radio frame configuration, a specific filtering process performed by a transceiver in a frequency domain, a specific windowing process performed by a transceiver in a time domain, or the like.

A slot may be formed of, in a time domain, one or more symbols (Orthogonal Frequency Division Multiplexing (OFDM) symbols, Single Carrier Frequency Division Multiple Access (SC-FDMA) symbols). A slot may be a unit of time based on the numerology.

A slot may include a plurality of mini-slots. In a time domain, each mini-slot may be formed of one or more symbols. A mini-slot may also be referred to as a sub-slot. A mini-slot may be formed of fewer symbols than those of a slot. The PDSCH (or PUSCH) transmitted in a unit of time that is greater than a mini-slot may be referred to as PDSCH (or PUSCH) mapping type A. The PDSCH (or PUSCH) transmitted using a mini-slot may be referred to as PDSCH (or PUSCH) mapping type B.

Each of the radio frame, subframe, slot, mini-slot, and symbol represents a time unit for transmitting a signal. The radio frame, subframe, slot, mini-slot, and symbol may be called by respective different names.

For example, one subframe may be referred to as a transmission time interval (TTI: Transmission Time Interval), a plurality of consecutive subframes may be referred to as TTI, or one slot or one mini-slot may be referred to as TTI. Namely, at least one of a subframe and TTI may be a subframe (1 ms) in the existing LTE, may be a time interval shorter than 1 ms (e.g., 1 to 13 symbols), or a time interval longer than 1 ms. Note that the unit representing the TTI may be referred to as a slot, a mini-slot, or the like, instead of a subframe.

Here, the TTI refers to, for example, the minimum time unit of scheduling in radio communication. For example, in the LTE system, the base station performs scheduling for allocating radio resources (such as a frequency bandwidth, or transmission power that can be used in each user terminal) in units of TTIs to each user terminal. Note that the definition of the TTI is not limited to this.

The TTI may be a transmission time unit, such as a channel coded data packet (transport block), a code block, and a codeword, or may be a processing unit for scheduling, link adaptation, or the like. Note that, when a TTI is provided, a time interval (e.g., a symbol number) onto which a transport block, a code block, or a code ward is actually mapped may be shorter than the TTI.

Note that, when one slot or one mini-slot is referred to as a TTI, one or more TTIs (i.e., one or more slots or one or more mini-slots) may be the minimum time unit of scheduling. Additionally, the number of slots (the number of mini-slots) forming the minimum time unit of scheduling may be controlled.

A TTI with a time length of 1 ms may be referred to as an ordinary TTI (TTI in LTE Rel. 8-12), a normal TTI, a long TTI, an ordinary subframe, a normal subframe, a long subframe, a slot, or the like. A TTI that is shorter than a normal TTI may be referred to as a shortened TTI, a short TTI, a partial TTI (partial TTI or fractional TTI), a shortened subframe, a short subframe, a mini-slot, a sub-slot, a slot, or the like.

Note that a long TTI (e.g., a normal TTI, a subframe) may be replaced with a TTI with a time length exceeding 1 ms, and a short TTI (e.g., a shortened TTI) may be replaced with a TTI with a TTI length that is shorter than the TTI length of the long TTI and longer than or equal to 1 ms.

A resource block (RB) is a resource allocation unit in the time domain and the frequency domain, and may include one or more consecutive subcarriers in the frequency domain. A number of subcarriers included in a RB may be the same irrespective of numerology, and may be 12, for example. The number of subcarriers included in a RB may be determined based on numerology.

Additionally, the resource block may include one or more symbols in the time domain, and may have a length of one slot, one mini-slot, one subframe, or one TTI. Each of one TTI and one subframe may be formed of one or more resource blocks.

Note that one or more RBs may be referred to as a physical resource block (PRB: Physical RB), a subcarrier group (SCG: Sub-Carrier Group), a resource element group (REG: Resource Element Group), a PRB pair, a RB pair, or the like.

Additionally, a resource block may be formed of one or more resource elements (RE: Resource Element). For example, 1 RE may be a radio resource area of 1 subcarrier and 1 symbol.

In the present disclosure, for example, if an article is added by translation, such as "a," "an," and "the" in English, the present disclosure may include that the noun following the article is plural.

In the present disclosure, the term "A and B are different" may imply that "A and B are different from each other." Note that the term may also imply "each of A and B is different from C." The terms, such as "separated" or "coupled," may also be interpreted similarly.

While the present invention is described in detail above, those skilled in the art will appreciate that the present invention is not limited to the embodiments described in this specification. The present invention may be implemented as modifications and variations without departing from the gist and scope of the present invention as defined by the claims. Accordingly, the description of this specification is for illustrative purposes only and is not intended to have any restrictive meaning with respect to the present invention.

LIST OF REFERENCE SYMBOLS

10 base station
20 terminal
101 transmitter
102 receiver
103 controller
201 transmitter
202 receiving unit
203 controller
1001 processor
1002 memory
1003 storage
1004 communication device
1005 input device
1006 output device

The invention claimed is:

1. A terminal comprising:
- a receiver that receives a plurality of radio signals transmitted via a sidelink;
- a controller that selects an operation pattern for Hybrid Automatic Repeat Request (HARQ) feedback for the plurality of radio signals based on a specific condition; and
- a transmitter that transmits sidelink HARQ feedback information in accordance with the selected operation pattern for the HARQ feedback,
- wherein the controller selects the operation pattern for the HARQ feedback for the plurality of radio signals based on a maximum number of Physical Sidelink Feedback Channel (PSFCH) transmissions performable at a same timing, and
- wherein the operation pattern refers to transmitting multiple HARQ-ACK bits by multiplexing the multiple HARQ-ACK bits, or not to transmit some of the multiple HARQ-ACK bits.

2. The terminal according to claim 1, wherein the controller selects the operation pattern for the HARQ feedback for the plurality of radio signals based on a cast type of each radio signal of the plurality of radio signals transmitted via the sidelink.

3. The terminal according to claim 1, wherein the controller selects the operation pattern for the HARQ feedback for the plurality of radio signals based on a HARQ feedback option applied to a sidelink groupcast transmission.

4. The terminal according to claim 1, wherein the controller selects the operation pattern for the HARQ feedback for the plurality of radio signals based on at least one of a transmitting terminal, a priority order of each of a plurality of Physical Sidelink Feedback Channel (PSFCH) transmissions, or a number of the plurality of PSFCH transmissions.

5. A communication method performed by a terminal, the method comprising:
- receiving a plurality of radio signals transmitted via a sidelink;
- selecting an operation pattern for Hybrid Automatic Repeat Request (HARQ) feedback for the plurality of radio signals based on a specific condition;
- transmitting sidelink HARQ feedback information in accordance with the selected operation pattern for the HARQ feedback; and
- selecting the operation pattern for the HARQ feedback for the plurality of radio signals based on a maximum number of Physical Sidelink Feedback Channel (PSFCH) transmissions performable at a same timing,
- wherein the operation pattern refers to transmitting multiple HARQ-ACK bits by multiplexing the multiple HARQ-ACK bits, or not transmitting some of the multiple HARQ-ACK bits.

* * * * *